US010067657B2

(12) United States Patent
Fagans et al.

(10) Patent No.: US 10,067,657 B2
(45) Date of Patent: Sep. 4, 2018

(54) USER CONFIGURABLE QUICK GROUPS

(71) Applicant: Apple Inc., Cupertino, CA (US)

(72) Inventors: Joshua Fagans, Redwood City, CA (US); Timothy B. Martin, Sunnyvale, CA (US); Matt Evans, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 320 days.

(21) Appl. No.: 15/068,726

(22) Filed: Mar. 14, 2016

(65) Prior Publication Data

US 2016/0196046 A1 Jul. 7, 2016

Related U.S. Application Data

(63) Continuation of application No. 11/888,962, filed on Aug. 3, 2007, now Pat. No. 9,305,027.

(51) Int. Cl.
*G06F 3/048* (2013.01)
*G06F 3/0484* (2013.01)
*G06F 17/30* (2006.01)
*G06F 3/0482* (2013.01)

(52) U.S. Cl.
CPC ........ *G06F 3/04842* (2013.01); *G06F 3/0482* (2013.01); *G06F 17/3028* (2013.01)

(58) Field of Classification Search
CPC . G06F 3/04842; G06F 3/0482; G06F 17/3028
See application file for complete search history.

(56) References Cited

U.S. PATENT DOCUMENTS

| 6,012,069 A | 1/2000 | Shibazaki |
| 6,323,846 B1 | 11/2001 | Westerman et al. |
| 6,462,761 B1 | 10/2002 | Hasuo |
| 6,466,237 B1 | 10/2002 | Miyao et al. |
| 7,552,400 B1 | 6/2009 | Sriver et al. |
| 7,913,189 B2 | 3/2011 | Baba |
| 2005/0216864 A1 | 9/2005 | Dart et al. |
| 2006/0161889 A1 | 7/2006 | Stabb et al. |
| 2007/0112844 A1 | 5/2007 | Tribble et al. |
| 2007/0152983 A1 | 7/2007 | McKillop et al. |
| 2007/0294294 A1 | 12/2007 | Aarnio et al. |
| 2009/0037449 A1 | 2/2009 | Fagans et al. |

*Primary Examiner* — Anil N Kumar
(74) *Attorney, Agent, or Firm* — Ronald S. Fernando

(57) ABSTRACT

This invention is directed to defining quick groups for easily associating keywords with an object (e.g., a media objection) accessible using an electronic device. The user of an electronic device may define several keywords that identify attributes of an object accessible using the electronic device. The user may associate keywords with an object to link the attribute of the keyword with the object (e.g., associate a keyword entitled "vacation" to vacation pictures). The user may assign a shortcut key to each of a subset of the keywords, referred to as quick groups, by which the user may rapidly associate the keyword to an Object. In some embodiments, the electronic device may select the shortcut key of a quick group from the letters of the quick group to help the user remember the shortcut key.

16 Claims, 9 Drawing Sheets

USER CONFIGURABLE QUICK GROUPS

CROSS-REFERENCE TO RELATED APPLICATION

This application is a continuation (and claims the benefit of priority under 35 USC 120) of U.S. application Ser. No. 11/888,962, filed Aug. 3, 2007, now allowed, which is incorporated by reference.

BACKGROUND OF THE INVENTION

This invention is related to configuring quick groups for quickly associating keywords with an object, such as media objects, accessible using an electronic device.

Using electronic devices, users may access different media objects, such as videos and images. The media objects may be stored in one or more folders, which may be named for an attribute of the media objects stored in the folder. Some media objects, however, may include many attributes that the user would like to associate with each of the media objects. For example, a user may wish to associate vacation pictures taken with friends with tags for the location of the vacation, the activity conducted, the people in each picture, or any other tag that may be of interest to the user. Accordingly, some electronic device may allow users to define metadata keywords that can be associated with media objects.

Some users may have very large numbers of media objects with which the users may wish to associate keywords. Using keywords as implemented in some known electronic devices, users may be forced to select media objects to be associated with a particular keyword, and then select the keyword using an input mechanism, for example by selecting the appropriate keyword icon displayed on-screen. This process may be cumbersome and time intensive, and thus prevent busy or impatient users from avoid associating keywords with media objects. There is a need, therefore, for a system by which users may easily associate tags with media objects accessible using an electronic device.

SUMMARY OF THE INVENTION

Systems and methods for creating and associating quick groups with media objects accessible using an electronic device are provided.

The user of an electronic device may define several keywords that may be associated with media objects (e.g., videos, music, or pictures) and may select a subset of the keywords. In response to receiving the user selection of the subset of keywords, the electronic device may assign a shortcut key to each of the subset of keywords to form a quick group from each of the selected subset of keywords.

To associate a quick group with one or more media objects, the user may select the one or more media objects, and provide an input corresponding to the shortcut key assigned to the quick group. For example, if the shortcut key assigned to the quick group is a letter of the alphabet, the user may simply press the key corresponding to the letter on the keyboard of the user's electronic device to associate the one or more media objects with the quick group.

The electronic device may select the shortcut key to assign to each quick group using any suitable approach. For example, the electronic device may assign the first letter of a quick group as the shortcut key of the quick group. If the electronic device determines that the first letter of the quick group is not available (e.g., it has already been taken by an existing quick group), the electronic device may assign a subsequent letter of the quick group as the shortcut key of the quick group. If the electronic device determines that none of the letters of the quick group are available, the electronic device may assign an arbitrary letter as the shortcut key of the quick group.

In some embodiments, the electronic device may periodically update the shortcut keys associated with each quick group. For example, the electronic device may identify existing quick groups and their assigned shortcut keys, and determine whether the first character of any existing quick group is the shortcut key assigned to another quick group that does not begin with that character (e.g., it is a subsequent character of the other quick group, or was the next available character when the other quick group was created). In response to determining that the first character of a quick group is the shortcut key assigned to another quick group that does not begin with that character, the electronic device may reassign the shortcut key to the quick group for which it is the first character, and assign another shortcut key to the other quick group.

BRIEF DESCRIPTION OF THE DRAWINGS

The above and other features of the present invention, its nature and various advantages will be more apparent upon consideration of the following detailed description, taken in conjunction with the accompanying drawings, and in which.

DETAILED DESCRIPTION

Figure 1:
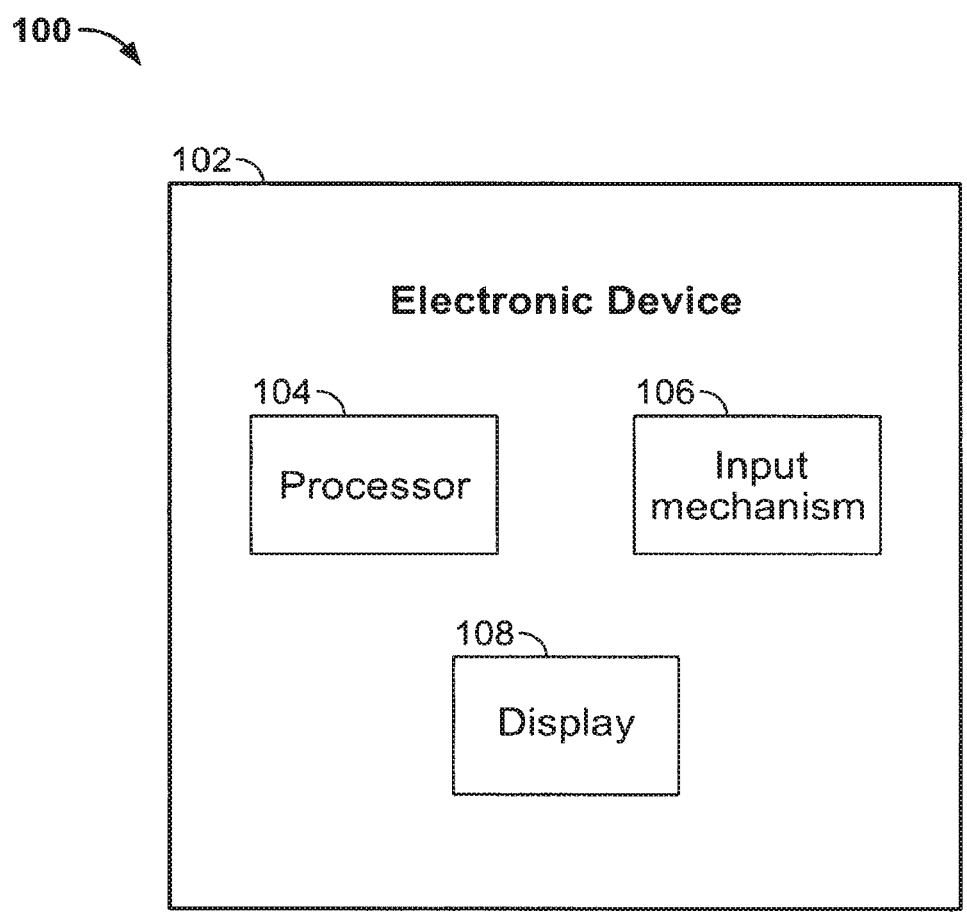
FIG. 1 is a schematic view of an illustrative system in which objects may be associated with user configurable quick groups in accordance with one embodiment of the invention.

FIG. 1 is a schematic view of an illustrative system in which objects may be associated with user configurable quick groups in accordance with one embodiment of the invention. System 100 may include electronic device 102. Electronic device 102 may be any electronic device with which a user may access objects (e.g., images, videos, music or other files). Suitable electronic devices may include, for example, a computer, a cellular telephone, a mobile communications device, a personal media device, a set-top box, a television system, combinations thereof (e.g., the iPhone, available from Apple Inc. of Cupertino, Calif.) or any other suitable electronic device.

Electronic device 102 may include processor 104 for performing the operations of electronic device 102. Processor 104 may be coupled to any other suitable component of electronic device 102. For example, processor 104 may be coupled to memory, a storage device, communications circuitry, a display, audio circuitry, a bus, an I/O component, or any other suitable component.

System 100 may include input mechanism 106 for providing user inputs to electronic device 102. Input mechanism 106 may include any suitable mechanism for providing user inputs or instructions to electronic device 102. Input mechanism 106 may take a variety of forms, such as one or more buttons, keyboard, keypad, dial, click wheel, mouse, or a touch screen. The user interface may include a multi-touch screen such as that described in U.S. Pat. No. 6,323,846, which is incorporated by reference herein in its entirety. The user interface may emulate a rotary phone or a multi-button keypad, which may be implemented on a touch screen or the combination of a click wheel or other user input device and a screen. A more detailed discussion of such a rotary phone interface may be found, for example, in U.S. patent application Ser. No. 11/591,752, filed Nov. 1, 2006, entitled "Touch Pad with Symbols based on Mode," which is incorporated by reference herein in its entirety.

Screen 108 may be any suitable screen for displaying objects, media or other content to a user. For example, screen 108 may be a television, a projector, a monitor (e.g., a computer monitor), a media device display (e.g., a media player or video game console display), a communications device display (e.g., a cellular telephone display), a component coupled with a graphical output device, any combinations thereof, or any other suitable screen.

The user may organize objects accessible using electronic device 102 using any suitable approach. In particular, the user may use the quick groups of this invention to organize large amounts of media objects tored or placed in one location. For example, the user may organize pictures into albums using quick groups (e.g., in iPhoto). As another example, the user may organize music into playlists using quick groups (e.g., in iTunes). In the following discussion, embodiments of the invention will be illustrated in the context of images (e.g., photographs taken by a camera). It will be understood, however, that any object (e.g., including any media object such as music) accessible using electronic device 102 may be organized in accordance with embodiments of this invention.

Figure 2:
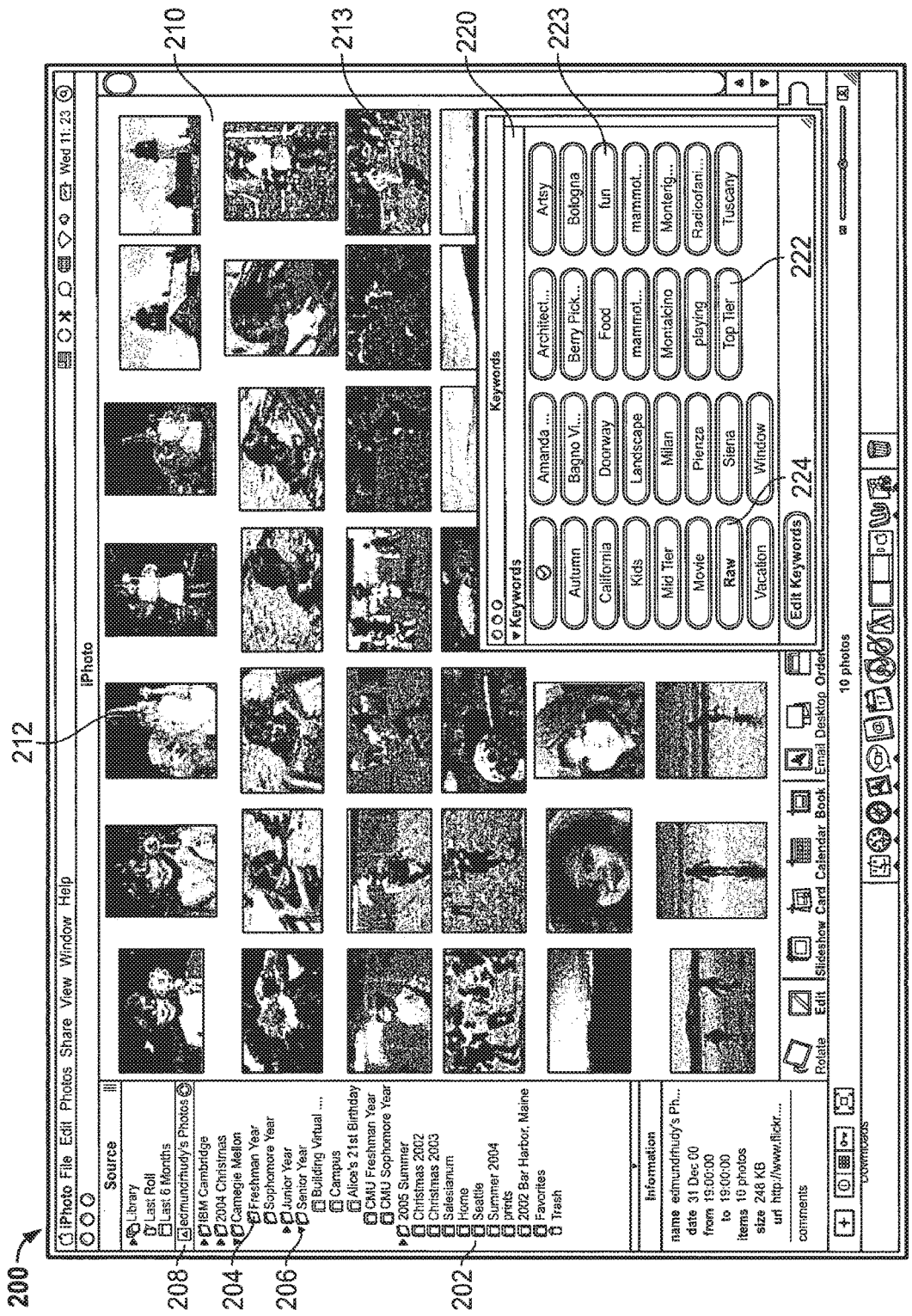
FIG. 2 is an illustrative display screen for organizing images in accordance with one embodiment of the invention.

FIG. 2 is an illustrative display screen for organizing images in accordance with one embodiment of the invention. Display screen 200 may include folder tree 202 and image portion 210. Folder tree 202 may include several folders 204 organized in a tree structure. The user may navigate the tree structure by selecting arrows 206. In response to selecting an arrow 206, the electronic device may display or hide the subfolders of the folder associated with the arrow 206. For example, in response to selecting the folder entitled "Senior Year," the electronic device may display subfolders entitled "Building Virtual World," "Campus," and "Alice's 21st birthday." In response to selecting a particular folder (e.g., identified by highlight region 208), the electronic device may display the images stored in the selected folder in image portion 210.

Image portion 210 may include several thumbnails 212 of images stored in the folder identified by highlight, region 208. Thumbnails 212 may be displayed in any suitable manner or order, including for example by file name, file size, date and time taken, or any other suitable manner or order. In some embodiments, the user may select a thumbnail 212 to view the full-size image associated with the thumbnail.

The user may store images in folders 204 of folder tree 202. By naming folders 204, the user may provide an indication of the attributes or characteristics associated with the objects the images) stored in each folder 204. Although this approach may be effective for providing an indication of one attribute of an image, it may prevent the user from associating several attributes to the same image. For example, if an image includes attributes related to two or more folders, the user may be forced to either select one attribute and store the image in the folder associated with the selected attribute, or store the image in all of the appropriate folders, which may unnecessarily take up additional memory and become confusing for the user.

To accommodate images having attributes conducive to associating the images with several folders, the electronic device may provide keywords that may be associated with images. Keywords may include any data that can be associated with images, including for example metadata. Using keywords, the user may associate several attributes with a single image (e.g., associate the keywords "Yankees," "San Francisco," and "Business Trip" with a picture of a Yankees-Giants baseball game played during the user's business trip to San Francisco) to more accurately describe the image without changing the location of the image in memory (e.g., without changing the folder in which the image is located). In some embodiments, keywords may be used to create albums of related images (e.g., a vacation album of images associated with the keyword "Vacation").

FIG. 2 may include pop-up window 220 of keywords 222. Although keywords 222 are provided in a pop-up window in FIG. 2, it will be understood that any other approach (e.g., new screen, tool bar, or new icons) may be used to provide keywords 222 to the user. To associate a keyword with an image, the user may first select one or more thumbnails 212 (e.g., using an input mechanism, such as a keyboard and/or a mouse), and subsequently select a keyword 222 (e.g., by selecting an on-screen keyword option). For example, to associate an image of a child playing soccer with the keyword "fun," the user may first select the thumbnail of the image (e.g., thumbnail 213), and subsequently select "fun" keyword 223. In some embodiments, the user may first select a keyword 222, and subsequently select one or more thumbnails 212. The electronic device may identify the currently selected keyword 222 by using highlight region 224. If an image is currently selected, the electronic device may identify the one or more keywords associated with the image using highlight region 224.

In some embodiments, the user may wish to associate several images with several different keywords quickly. Using the approach described above, the user would need to select each image individually, and subsequently select each of the keywords that are to be associated with each image. Alternatively, the user would instead first select a particular keyword and associate it with each appropriate image, then repeat this process for every other keyword of interest. While this approach may provide the desired result, it may be cumbersome and slow to use, especially if the user has a large number of images, keywords, or both.

Figure 3:
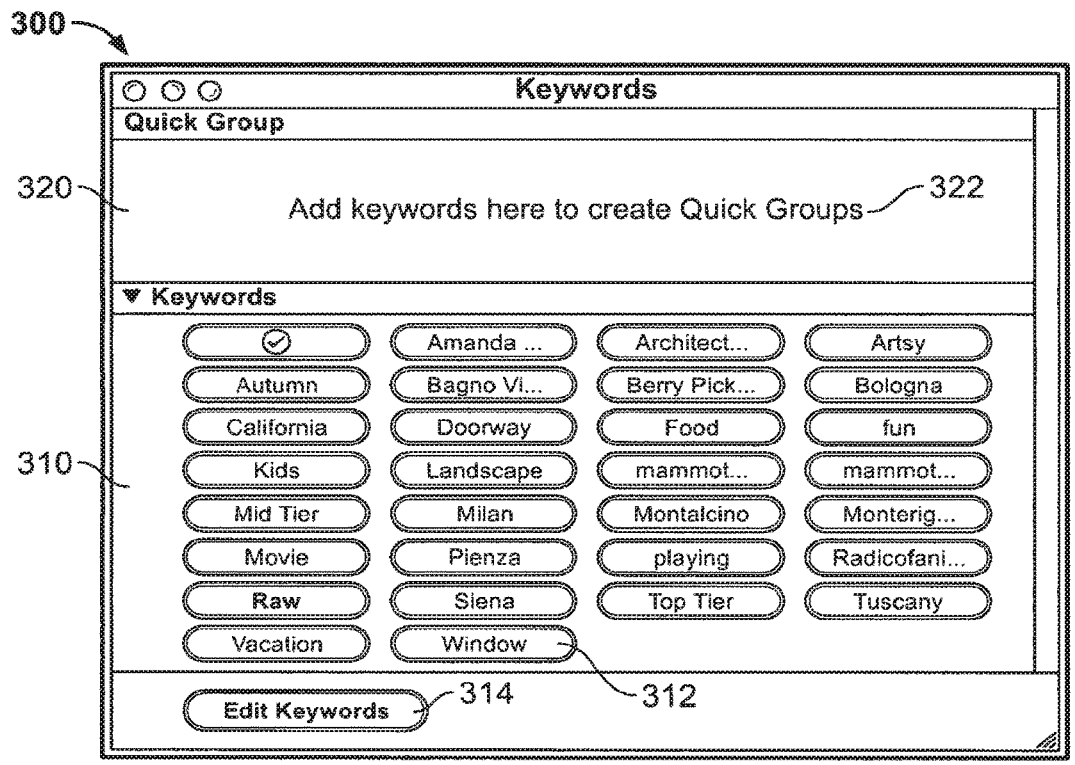
FIG. 3 is an illustrative display screen of a quick group window in accordance with one embodiment of the invention.

To provide a more efficient mechanism for associating keywords with images, the electronic device may create shortcuts for one or more keywords. FIG. 3 is an illustrative display screen of a quick group window in accordance with one embodiment of the invention. Window 300 may include keyword portion 310 and quick group portion 320. Keyword portion 310 may include several keywords 312. The user may associate one or more keywords 312 with an image using any suitable approach described above. The user may edit keywords by selecting EDIT KEYWORDS option 314.

Figure 4:
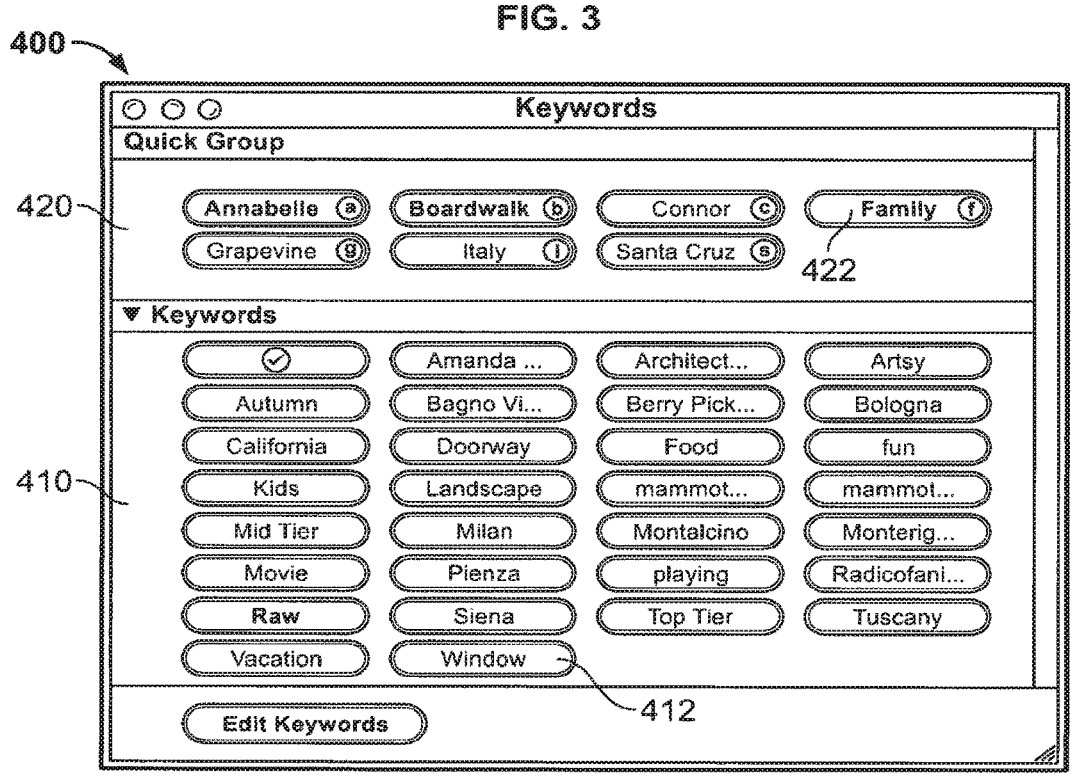
FIG. 4 is another illustrative display screen of a quick group window in accordance with one embodiment of the invention.

Quick group portion 320 may include notice 322 indicating that the user may add keywords into keyword portion 320 to create quick groups. FIG. 4 is another illustrative display screen of a quick group window in accordance with one embodiment of the invention. Window 400 may include keyword portion 410 and quick group portion 420, in which several keywords selected from keyword portion 410 have been placed. The user may add keywords to quick group portion 420 using any suitable approach. For example, the user may drag and drop keywords from keyword portion 410 to quick group portion 420. As another example, the user may select keywords from keyword portion 410 and provide an input with an input mechanism (e.g., input mechanism 106) to move keywords into quick group portion 420 (e.g., an "up arrow" or "move" input). Once moved from keyword portion 410 to quick group portion 420, keywords 412 may be identified as quick groups 422.

Figure 5:
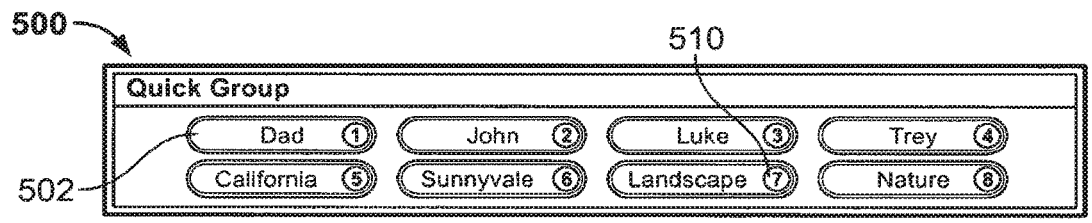
FIGS. 5 and 6 are illustrative display screens of quick group portions in accordance with one embodiment of the invention.
Figure 6:
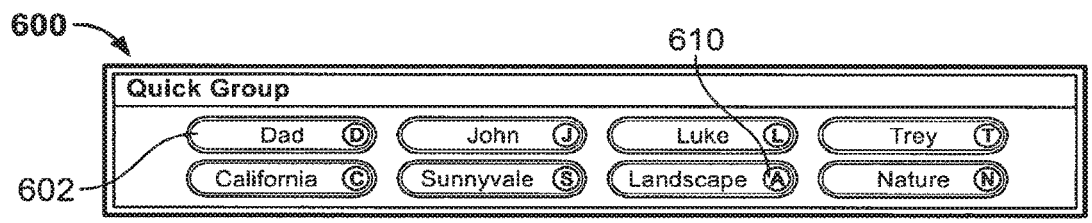

A shortcut key may be assigned to each quick group 422. The electronic device may use any suitable approach for assigning a shortcut key to quick group 422. FIGS. 5 and 6 are illustrative display screens of quick group portions in accordance with one embodiment of the invention. Quick group portion 500 may include quick groups 502, each of which may be associated with shortcut key 510. Similarly, quick group portion 600 may include quick groups 602, each of which may be associated with shortcut key 610. The electronic device may assign any suitable shortcut key for each of quick groups 502 and 602. For example, as shown in quick group portion 500 of FIG. 5, the electronic device may assign a number to each quick group. The electronic device may assign numbers using any suitable approach, including for example based on the order in which the quick words are formed, alphabetically (e.g., 1 for "California," 2 for "Dad," etc. in FIG. 5), or using any other suitable approach.

As another example, as shown in quick group portion 600 of FIG. 6, the electronic device may assign the first letter of each quick group to the quick group (e.g., the letter "b" is assigned to the quick group "Boardwalk," the letter "s" is assigned to the quick group "Santa Cruz"). In some embodiments, the electronic device may distinguish between uppercase and lowercase letters in shortcut key assignments, or may instead assign both uppercase and lowercase letters to the same quick group.

The electronic device may use any suitable approach for assigning shortcut keys to quick groups if the first letter of a particular quick group has already been used. For example, the electronic device may assign uppercase letters to a particular quick group (e.g., if the electronic device distinguishes between uppercase and lowercase letters). As another example, if a particular quick group has two words (e.g., Lands End) or two upper case letters (e.g., LaVache), the electronic device may assign the first letter of the second word or the next upper case letter to the particular quick group. As still another example, the electronic device may assign the second letter of a quick group to the quick group (e.g., assign the letter "r" to the quick group "Artsy" if the letter "a" is already assigned to the quick group "Annabelle"). As still another example, if every letter of a quick group is taken, the electronic device may assign any suitable key (e.g., the next unassigned letter in the alphabet).

Figure 7:
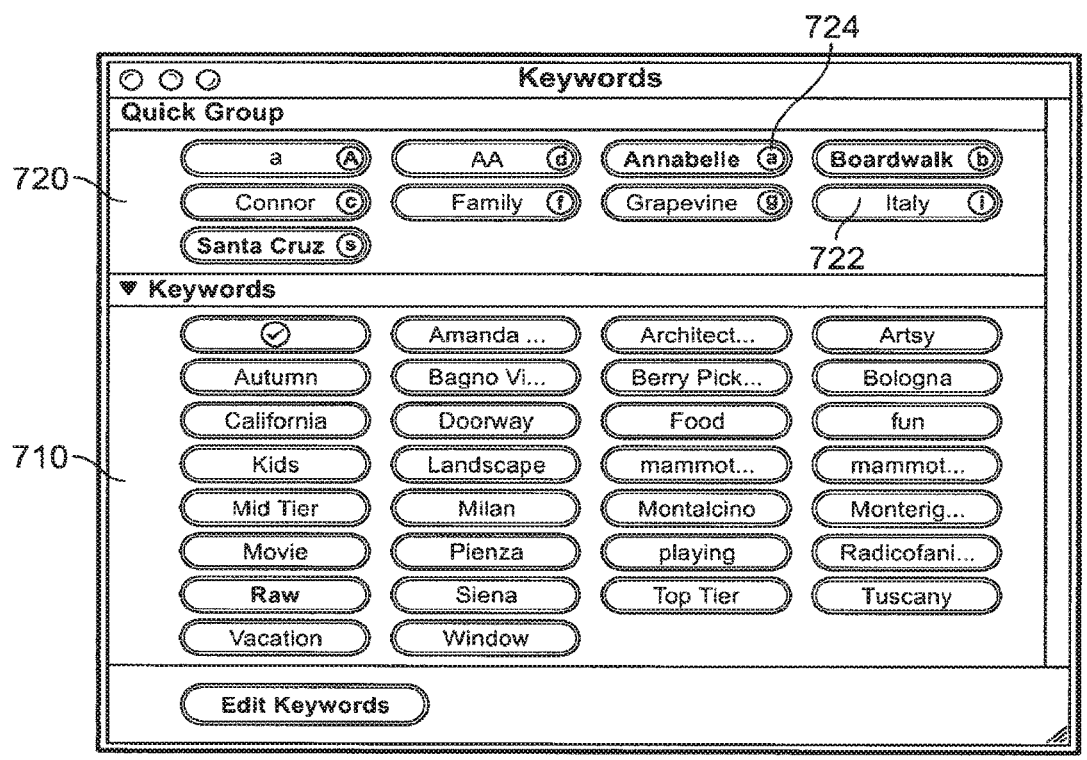
FIG. 7 is still another illustrative display screen of a quick group window in accordance with one embodiment of the invention.

The following discussion of FIG. 7 may serve to illustrate one example of a process for assigning particular shortcut keys to quick groups. FIG. 7 is still another illustrative display screen of a quick group window in accordance with one embodiment of the invention. Window 700 may include keyword portion 710 and quick group portion 720. Quick group portion 720 may include several quick groups 722, including quick groups "a," "AA" and "Annabelle." Because the quick group "Annabelle" was the first one created, it is assigned to the shortcut key "a," identified by shortcut key identifier 724. When the quick group "a" created, it can no longer be assigned to the shortcut key "a." Instead, the electronic device may assign quick group "a" to shortcut key "A" (e.g., the first letter of quick group "a" has already been taken, so use the uppercase letter "A"). When the quick group "AA" is subsequently created, the electronic device cannot assign either shortcut key "a" or shortcut key "A" to that group. In addition, the quick group "AA" has no other letters which could serve as a basis for a shortcut key. Therefore, the electronic device may assign the next available letter to quick group "AA" (e.g., shortcut key "d" in the example of FIG. 7 because "b" is taken by the quick group entitled "Boardwalk" and "c" is taken by the quick group entitled "Connor").

To associate a quick group with an image, the user may select an image and press the shortcut key assigned to the desired quick group. By selecting an image and sequentially selecting the shortcut keys of each of the quick groups with which the user desires to associate the image, the user may quickly associate a number of quick groups with an image. In some embodiments, the user may also use approaches described above in connection with keywords to associate quick groups with one or more images.

To allow the user to use the shortcut keys in other contexts than quick groups (e.g., press "t" to page to the top of a screen, or "p" to play music when the media objects are music files), the electronic device may not associate quick groups with images in response to user selections of shortcut keys unless the user provides an instruction to enable quick groups. For example, the electronic device may allow the user to associate quick groups with images using shortcut keys only when quick groups window 300 is displayed or selected. As another example, the electronic device may require the user to press an additional key along with the shortcut key (e.g., Ctrl or Option shortcut key). As still another example, the electronic device may determine, based on the context, whether to associate the quick group of a pressed shortcut key with an image (e.g., if an image is selected, the shortcut keys are enabled). In some embodiments, if quick groups are not enabled, the electronic device may simply treat quick groups as keywords.

The electronic device may store assignments of quick groups and quick group shortcut keys in memory of electronic device 102 (FIG. 1). For example, the electronic device may store the quick group and quick group shortcut key assignments in memory coupled to processor 104 (FIG. 1). The electronic device may store the quick group and quick group shortcut key assignments using any suitable data structure, including for example a table or a database (e.g., with one row or column of quick groups, and one row or column of assigned shortcut keys). In some embodiments, the electronic device may store keywords and quick groups in the same data structure.

Figure 8:
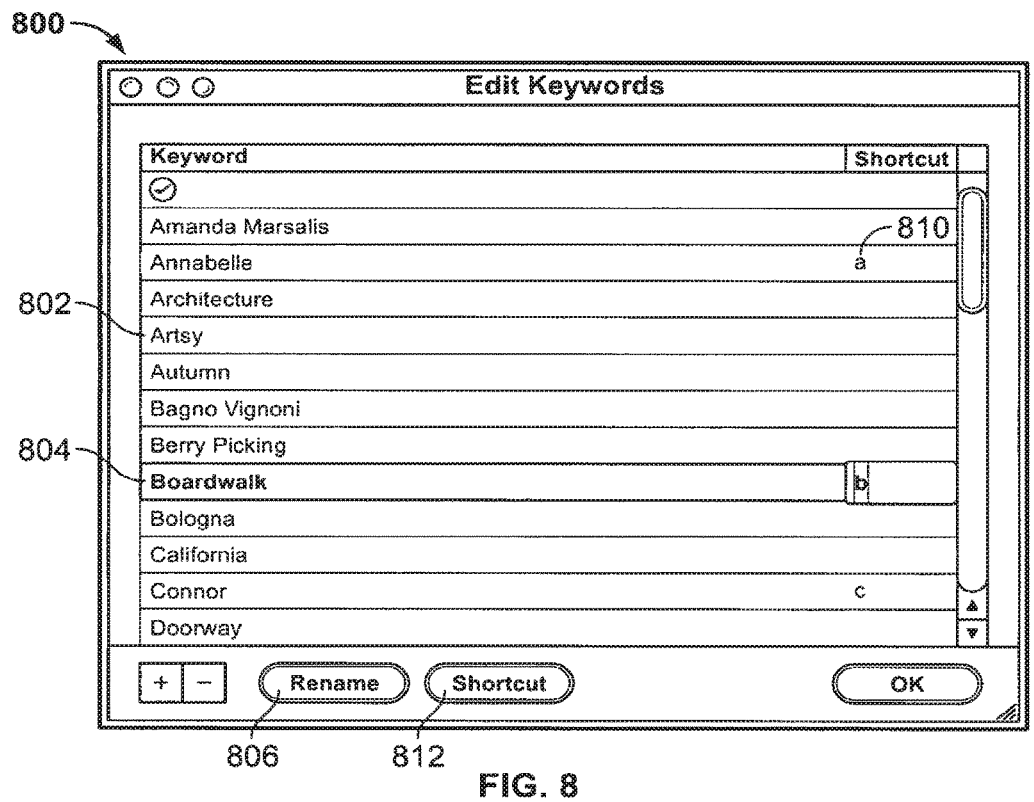
FIG. 8 is an illustrative display screen window for editing quick groups and keywords in accordance with one embodiment of the invention.

The user may edit quick groups and assigned shortcut keys using any suitable approach. FIG. 8 is an illustrative display screen of a window for editing quick groups and keywords in accordance with one embodiment of the invention. The user may access screen 800 using any suitable approach, including for example selecting an on-screen EDIT KEYWORDS option (e.g., option 314, FIG. 3). Screen 800 may include keywords 802. The user may select a keyword by placing highlight region 804 over the keyword. For example, the user may use input mechanism 106 (FIG. 1) to place a cursor over a key word 802 and provide a selection instruction. As another example, the user may use input mechanism 106 to direct highlight region to move up and down (e.g., the user presses up and down keys, or selects "+" or "−" on-screen icons).

The user may direct the electronic device to rename the keyword identified by highlight region 804 using any suitable approach. For example, the user may select on-screen RENAME option 806. As another example, the user may select the keyword identified by highlight region 804 a second time (e.g., click twice on the keyword using a pointer). Once the user has selected the keyword, the user may rename the keyword by providing a new name using the input mechanism (e.g., input mechanism 106, which may include a keyboard).

Window 800 may include quick group shortcuts 810, which may be assigned only to the keywords that have become quick groups. The user may change an existing quick group shortcut 810 using any suitable approach, including for example placing highlight region 804 over a quick group shortcut 810 and providing an instruction to change the shortcut (e.g., selecting on-screen SHORTCUT option 812). Once the user has selected a quick group shortcut 810, the user may provide an input for another shortcut key (e.g., using input mechanism 106). If the user selects a shortcut key that has already been assigned, the electronic device may, for example, inform the user of the conflict and prevent the assignment of the requested shortcut key to the selected quick group. As another example, the electronic device may assign the shortcut key to the selected quick group, and assign a new shortcut key to the quick group that was previously assigned to the selected shortcut key (e.g., automatically, or the electronic device may prompt the user to provide a new shortcut key).

In some embodiments, the user may create new quick groups using window 800. For example, if the user assigns a shortcut key to a keyword 802 that initially did not have a shortcut key assigned, the electronic device may form a quick group from the keyword (e.g., and move the keyword from keyword portion 310 to quick group portion 320, FIG. 3). The user may add a shortcut to a keyword using any suitable approach, including for example placing highlight region 804 over a keyword 802 and providing an instruction to add a shortcut (e.g., selecting on-screen SHORTCUT option 812). The user may then provide an input defining a shortcut key (e.g., using input mechanism 106).

Figure 9:
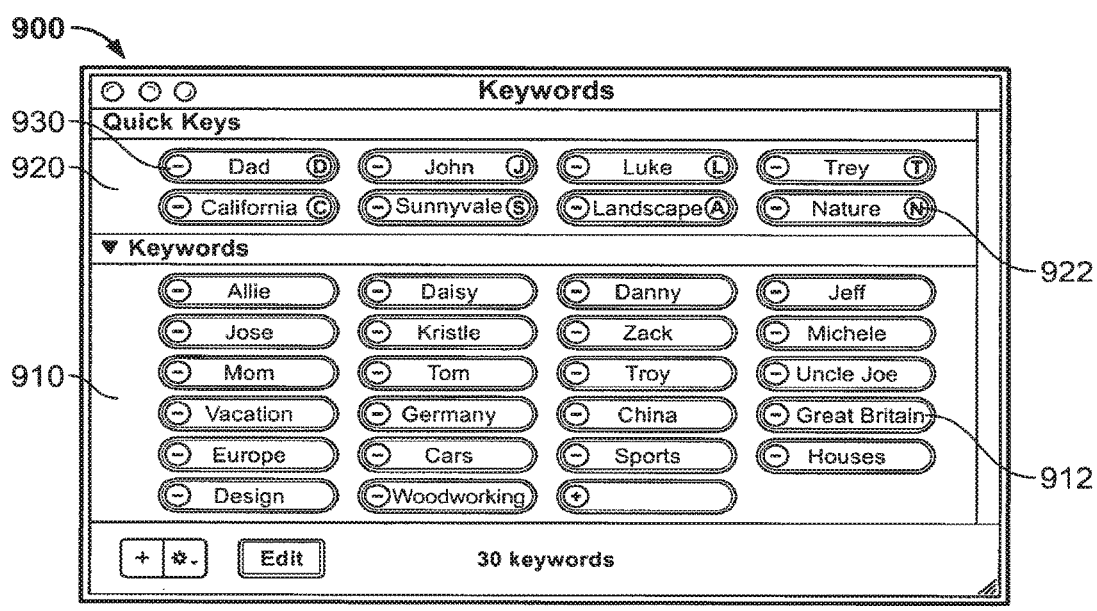
FIG. 9 is an illustrative display screen of a quick group window in response to a user request to edit keywords and quick groups in accordance with one embodiment of the invention.

In some embodiments, the user may edit keywords and quick groups without needing to access window 800. FIG. 9 is an illustrative display screen of a quick group window in response to a user request to edit keywords and quick groups in accordance with one embodiment of the invention. The user may provide an edit request using any suitable approach, including for example selecting an on-screen EDIT option (e.g., EDIT option 314, FIG. 3). Window 900 may include keywords portion 910 and quick groups portion 920. Keywords 912 and quick groups 922 in keywords portion 910 and quick group portion 920, respectively, may be identified by icon 930 as accessible for editing.

Figure 10:
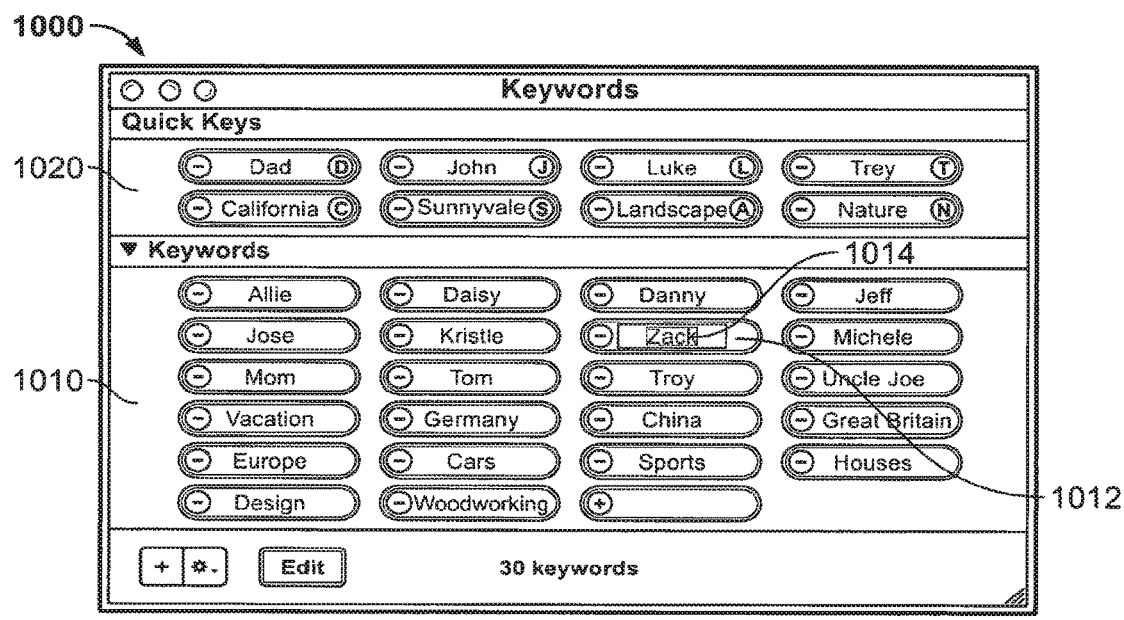
FIG. 10 is an illustrative display screen of the quick group window of FIG. 9 in response to a user request to edit a keyword in accordance with one embodiment of the invention.

In response to selecting a keyword or quick group, the electronic device may allow the user to edit the selected keyword or quick group. FIG. 10 is an illustrative display screen of the quick group window of FIG. 9 in response to a user request to edit a keyword in accordance with one embodiment of the invention. Window 1000 may include keyword portion 1010, in which keyword 1012 has been selected for editing. The electronic device may highlight keyword 1012 with highlight region 1014 to indicate to the user that the keyword may be edited. The user may provide an input using an input mechanism (e.g., input mechanism 106, FIG. 1) to change selected keyword 1012. In some embodiments, the user may also edit quick groups of quick group portion 1020 using the same approach. In some embodiments, the user may cancel editing keyword 1012 by providing a CANCEL or ESCAPE instruction (e.g., using input mechanism 106).

Figure 11:
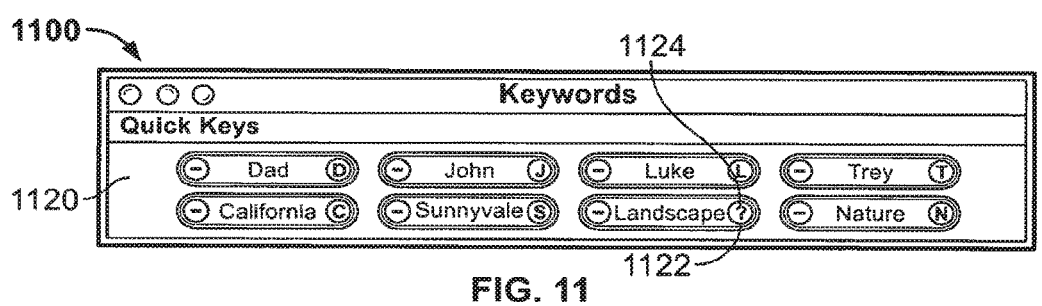
FIG. 11 is an illustrative display screen of the quick group portion of FIG. 9 in response to a user request to edit a shortcut key in accordance with one embodiment of the invention.

FIG. 11 is an illustrative display screen of the quick group portion of FIG. 9 in response to a user request to edit a shortcut key in accordance with one embodiment of the invention. Window 1100 may include quick group portion 1120, in which shortcut key 1122 has been selected for editing. The electronic device may identify that shortcut key 1122 has been selected for editing using icon 1124 (e.g., a question mark icon). The user may provide a new shortcut key 1122 using an input mechanism (e.g., input mechanism 106, FIG. 1). In some embodiments, the user may cancel editing shortcut key 1122 by providing a CANCEL or ESCAPE instruction (e.g., using input mechanism 106).

Figure 12:
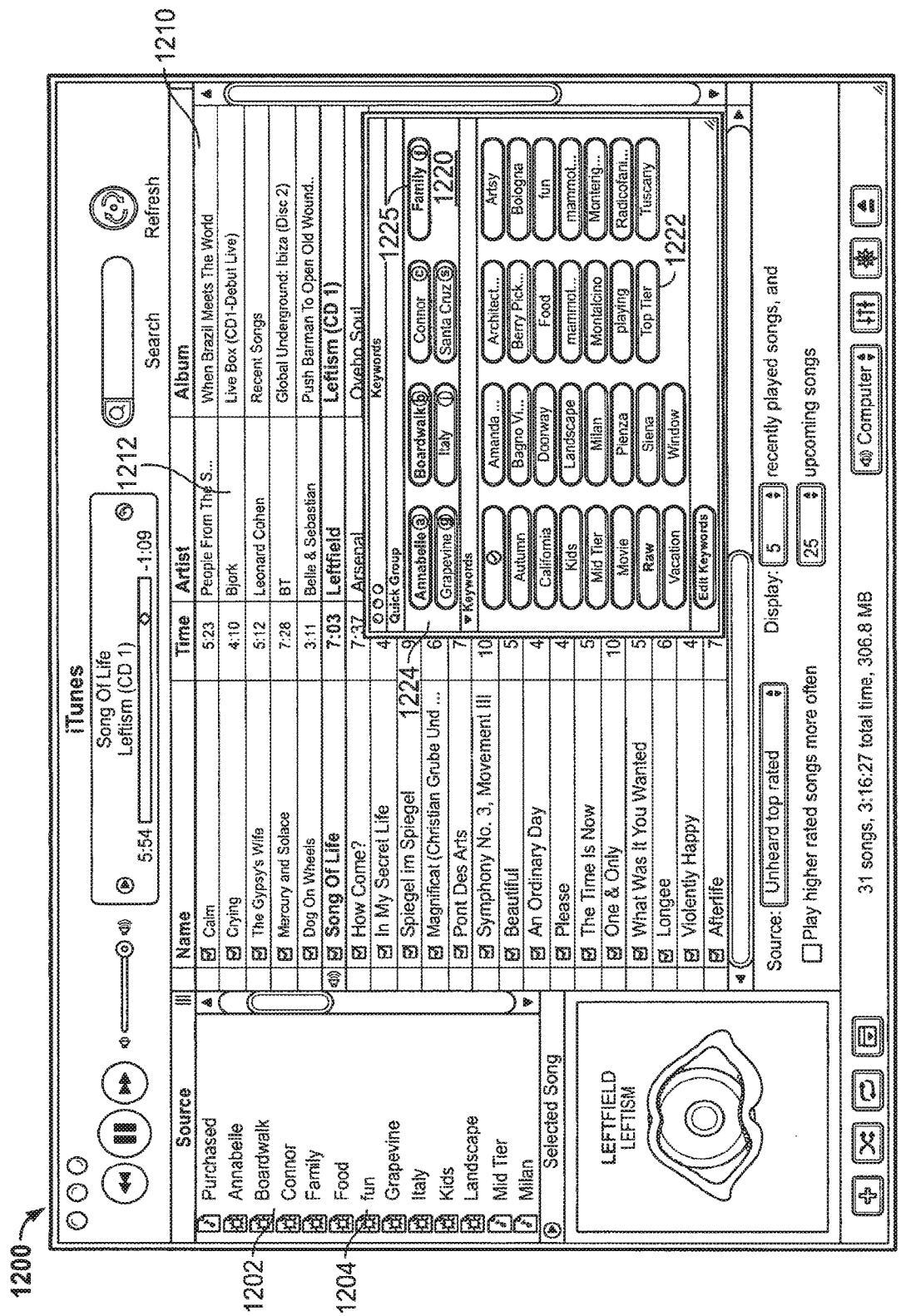
FIG. 12 is an illustrative display screen for organizing audio in accordance with one embodiment of the invention.

In some embodiments, quick groups may be used in the context of music or audio. For example, quick groups may be used to define the content of playlists (e.g., where each playlist is associated with or is defined as a quick group). FIG. 12 is an illustrative display screen for organizing audio in accordance with one embodiment of the invention. Display screen 1200 may include playlist portion 1202 and audio portion 1210. Playlist portion 1202 may include several playlists 1204, each a collection of audio. Audio portion 1210 may include listings 1212 of music and other audio available to the user of the electronic device. Listings 1212 may be displayed in any suitable order, including by name, audio length, artist, album, or any other suitable order. In response to selecting a listing 1212, the electronic device may play the audio of the selected listing.

The user may place audio from audio portion 1210 in playlists 1204 using any suitable approach. In some embodiments, the user may drag and drop a listing 1212 into a playlist 1204. In some embodiments, the electronic device may define quick groups associated with each playlist (e.g., each quick group is a playlist). The electronic device may display pop-up window 1220 that includes keywords 1222 and quick groups 1224. Although keywords 1222 and quick groups 1224 are provided in a pop-up window in FIG. 12, it will be understood that any other approach (e.g., new screen, tool bar, or new icons) may be used to provide keywords 1222 and quick groups 1224 to the user. To associate a quick, group (e.g., and thus a playlist) with a listing, the user may select a listing and press the shortcut key associated with the quick group (e.g., shortcut key 1225).

Figure 13:
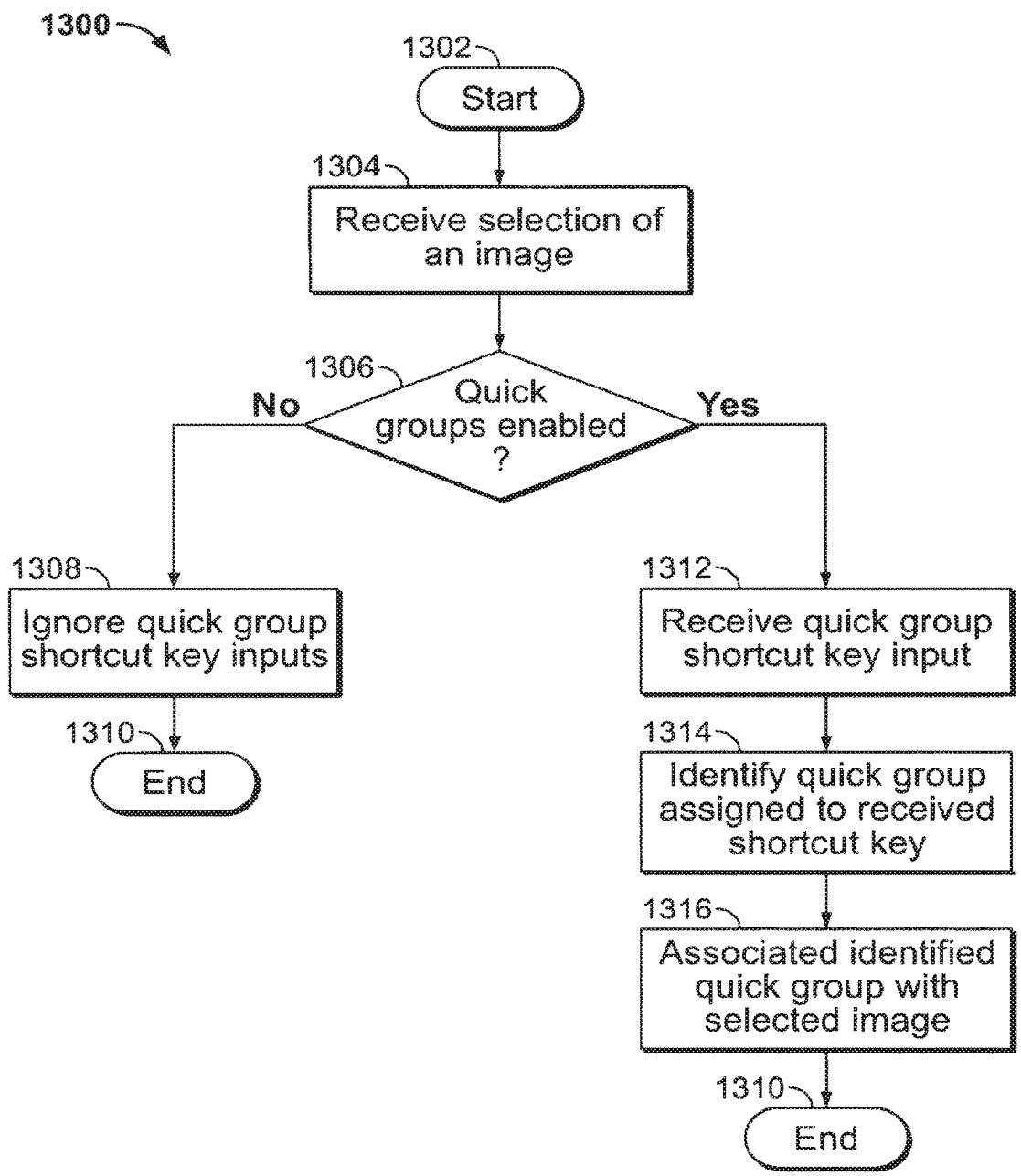
FIG. 13 is an illustrative flow chart of a process for associating a quick group with an image in accordance with one embodiment of the invention.

The following flow charts serve to illustrate processes involved in some embodiments of this invention. Although the following flow chart may include references to the letters or numbers being used as shortcut key, it will be understood that in that context, the terms "letter" and "number" may include any character that may be used as a shortcut key. In addition, it will be understood that image may be substituted for any other suitable media (e.g., audio or music). FIG. 13 is an illustrative flow chart of a process for associating a quick group with an image in accordance with one embodiment of the invention. Process 1300 may begin at step 1302. At step 1304, the electronic device may receive a selection of an image. For example, the user may select an image displayed on display 108 using input mechanism 106 (FIG. 1). As another example, electronic device 102 (FIG. 1) may automatically select an image. At step 1306, the electronic device may determine whether quick groups are enabled. For example, the electronic device may determine whether a quick groups window is displayed and/or selected. As another example, the electronic device may determine whether the user has provided an instruction to enable quick groups (e.g., whether the user has entered an input, such as a key or key sequence, using input mechanism 106 to enable quick groups).

If the electronic device determines that quick groups are not enabled, process 1300 may move to step 1308. At step 1308, the electronic device may ignore quick group shortcut keys entered by the user. For example, the electronic device may ignore inputs provided by input mechanism 106 that correspond to quick group shortcut keys. As another example, the electronic device may perform operations other than associating a quick group with a selected image in response to receiving an input of a shortcut key from input mechanism 106. Process 1300 may then end at step 1310.

If, at step 1306, the electronic device instead determines that quick groups are enabled, process 1300 may move to step 1312. At step 1312, the electronic device may receive a quick group shortcut key. For example, the electronic device may receive an input from input mechanism 106 that corresponds to a quick group shortcut key. At step 1314, the electronic device may identify the quick group assigned to the quick group shortcut key received at step 1312. For example, the electronic device may identify the quick group assigned to the received shortcut key using the data structure used to store the quick group and shortcut key assignments (e.g., a table).

At step 1316, the electronic device may associate the selected image with the identified quick group. For example, electronic device 102 may associate the image selected at step 1304 with the quick group identified at step 1314. The electronic device may perform the association using any suitable approach, including for example changing or adding metadata to the selected image to reflect the association of the quick group with the image. Process 1300 may then end at step 1310.

Figure 14:
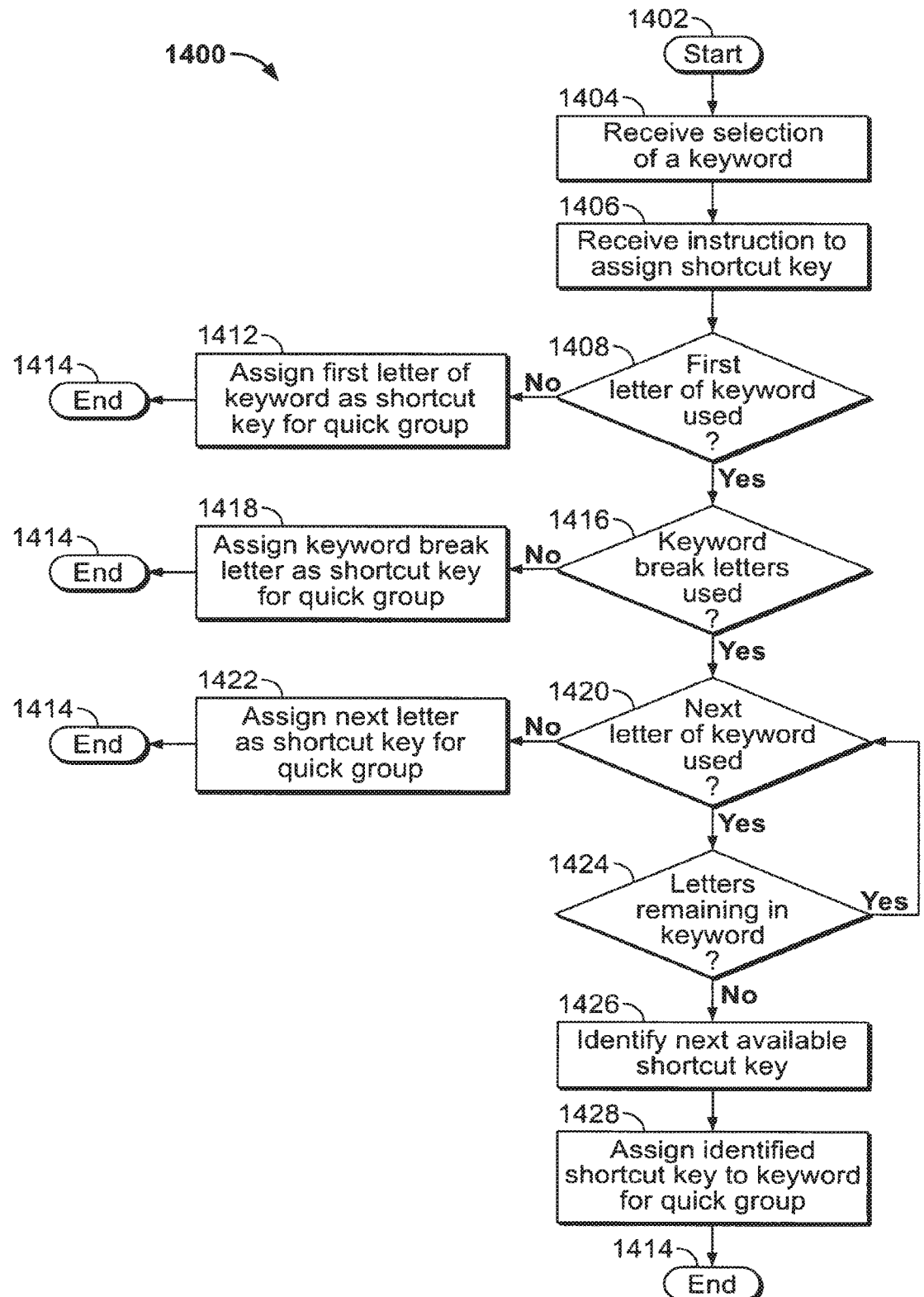
FIG. 14 is a flow chart of an illustrative process for assigning a shortcut key to a quick group in accordance with one embodiment of the invention.

FIG. 14 is a flow chart of an illustrative process for assigning a shortcut key to a quick group in accordance with one embodiment of the invention. Process 1400 may begin at step 1402. At step 1404, the electronic device may receive a selection of a keyword. For example, the user may provide an instruction to select a keyword using input mechanism 106 (e.g., the user may place a highlight region over a keyword using input mechanism 106, FIG. 1). At step 1406, the electronic device may receive an instruction to assign a shortcut key to the selected keyword. For example, the electronic device may receive an instruction from input mechanism 106 to move a keyword into a quick groups portion (e.g., quick groups portion 420, FIG. 4). As another example, the electronic device may receive an instruction from input mechanism 106 to enter a shortcut key assigned to a selected keyword (e.g., using window 800, FIG. 8 or window 1100, FIG. 11).

At step 1408, the electronic device may determine whether the first letter of the selected keyword has been used as a shortcut key for an existing quick group. For example, the electronic device may determine whether the both the lowercase and uppercase first letter of the selected keyword have been assigned to an existing quick group. In some embodiments, the electronic device may compare the first letter of the selected keyword with the quick group and shortcut key assignments stored in memory to determine whether the first letter of the selected keyword has already been used.

If the electronic device determines that the first letter of the selected keyword has not been used as the shortcut key for an existing quick group, process 1400 may move to step 1412. At step 1412, the electronic device may assign the first letter of the selected keyword as the shortcut key of the new quick group. For example, the electronic device may create a new assignment in memory of the selected keyword and the shortcut key. In some embodiments, if both the lowercase and uppercase first letter are available as a shortcut key, the electronic device may prefer the lowercase shortcut key (e.g., reducing the number of keystrokes required to associate the quick group with an image). Process 1400 may then end at step 1414.

If, at step 1408, the electronic device instead determines that the first letter of the selected keyword has been used as a shortcut key for an existing quick group, process 1400 may move to step 1416. At step 1416, the electronic device may determine whether all of the keyword break letters have been used by as a shortcut key for existing quick groups. For example, the electronic device may determine whether the keyword has a break (e.g., a keyword that includes several words, for example Lands End, or a keyword that includes an intermediate upper case letter, for example LaVache). If the electronic device determines that the keyword has a break, the keyword may determine whether the letter at the break (e.g., "e" for Lands End, or "v" for LaVache") has already been used as a keyword for an existing quick group. In some embodiments, the electronic device may compare the keyword break letters with the quick group and shortcut key assignments stored in memory to determine whether the next letter of the selected keyword has already been used.

If the electronic device determines that a keyword break letter was not used, process 1400 may move to step 1418. At step 1418, the electronic device may assign the keyword break letter as the shortcut key of the selected keyword for the new quick group. For example, the electronic device may create a new assignment in memory of the selected keyword and the shortcut key. In some embodiments, if both the lowercase and uppercase next letter are available as a shortcut key, the electronic device may prefer the lowercase shortcut key (e.g., reducing the number of keystrokes required to associate the quick group with an image). Process 1400 may then end at step 1414.

If, at step 1416, the electronic device instead determines that all of the keyword break letters were used, or that there are not keyword break letters, process 1400 may move to step 1420. At step 1420, the electronic device may determine whether the next letter in the keyword has been used as a shortcut key for a quick group. For example, the electronic device may determine whether the both the lowercase and uppercase next letter of the selected keyword have been assigned to an existing quick group. In some embodiments, the electronic device may compare the next letter of the selected keyword with the quick group and shortcut key assignments stored in memory to determine whether the next letter of the selected keyword has already been used.

If the electronic device determines that the next letter of the selected keyword has not been used as a shortcut key for an existing quick group, process 1400 may move to step 1422. At step 1422, the electronic device may assign the next letter of the keyword as the shortcut key of the selected keyword for the new quick group. For example, the electronic device may create a new assignment in memory of the selected keyword and the shortcut key. In some embodiments, if both the lowercase and, uppercase next letter are available as a shortcut key, the electronic device may prefer the lowercase shortcut key (e.g., reducing the number of keystrokes required to associate the quick group with an image). Process 1400 may then end at step 1414.

If, at step 1420, the electronic device instead determines that the next letter of the selected keyword has been used as a shortcut key for an existing quick group, process 1400 may move to step 1424. At step 1424, the electronic device may determine whether there are any letters remaining in the selected keyword. For example, the electronic device may determine whether all of the letters used in the keyword have been compared to shortcut keys assigned to existing quick groups. If the electronic device determines that letters are remaining in the selected keyword, process 1400 may move back to step 1420 and select the next letter of the selected keyword.

If, at step 1424, the electronic device instead determines that no letters are remaining in the selected keyword, process 1400 may move to step 1426. At step 1426, the electronic device may identify the next available shortcut key. For example, the electronic device may identify the next letter in the alphabet that has not yet been assigned to a quick group. At step 1428, the electronic device may assign the identified letter as the shortcut key of the selected keyword to form the new quick group. For example, the electronic device may create a new assignment in memory of the selected keyword and the shortcut key. In some embodiments, if both a lowercase and uppercase letter are available as a shortcut key, the electronic device may prefer the lowercase shortcut key (e.g., reducing the number of keystrokes required to associate the quick group with an image). Process 1400 may then end at step 1414.

In some embodiments, the electronic device may periodically update quick group shortcut key assignments. For example, the electronic device may update quick group shortcut key assignments at scheduled or arbitrary intervals. As another example, each time a new quick group is created, the electronic device may review its current quick group shortcut key assignments (e.g., instead of moving directly to step 1416 after step 1408). The electronic device may first determine whether the first letter of the selected keyword has been used as the shortcut key of another quick group that does not begin with the same first letter. For example, the electronic device may determine whether the first letter of the selected keyword has been assigned to another quick group because it is a subsequent letter of the other quick group. As another example, the electronic device may determine whether the first letter of the selected keyword was assigned because it was the next available letter arbitrarily chosen for an existing quick group (e.g., whether the first letter of the selected keyword was assigned to a quick group at a prior instance of step 1428). If the electronic device determines that the first letter of the selected keyword was assigned to another group that does not begin with the first letter of the selected keyword, the electronic device may, automatically or in response to a user instruction, assign the first letter of the keyword as the shortcut key of the new quick group, and change the shortcut key assigned to the other quick group (e.g., using process 1400).

The above described embodiments of the invention are presented for purposes of illustration and not of limitation, and the present invention limited only by the claims which follow.

What is claimed is:

1. A non-transitory computer-readable storage medium encoding instructions executable by a processor to perform operations comprising:
   displaying in a user interface, a keyword portion to display keywords and another portion to display keywords to which shortcut keys are assigned, wherein the keyword portion is separate from the other portion;
   displaying in the keyword portion, a first object representing a keyword that includes one or more characters;
   displaying, within the first object, the one or more characters included in the keyword; detecting a selection of the first object displayed in the keyword portion, wherein the selection represents input to assign a shortcut key to the keyword represented by the first object; in response to detecting the selection:
   displaying a second object in the other portion, and
   displaying, within the second object, the one or more characters included in the keyword;
   identifying a character as a shortcut key to the keyword; and
   displaying, within the second object, the one or more characters included in the keyword and the identified character.

2. The non-transitory computer-readable storage medium of claim 1, wherein the identified character is one of the one or more characters included in the keyword.

3. The non-transitory computer-readable storage medium of claim 1, wherein the keyword includes a plurality of characters, and wherein the identified character is a first character of the plurality of characters.

4. The non-transitory computer-readable storage medium of claim 1, the operations further comprising:
   detecting a selection of a media file;
   detecting input of the shortcut key; and
   assigning the keyword to which the shortcut key is assigned, to the media file.

5. The non-transitory computer-readable storage medium of claim 1, wherein the identified character is a character that is not included in the one or more characters included in the keyword.

6. The non-transitory computer-readable storage medium of claim 1, the operations further comprising:
   receiving input to alter the identified character; and altering the identified character in response to the input, resulting in an altered character, wherein the altered character is assigned as the shortcut key to the keyword.

7. A method comprising:
displaying in a user interface, a keyword portion to display keywords and another portion to display keywords to which shortcut keys are assigned, wherein the keyword portion is separate from the other portion;
displaying in the keyword portion, a first object representing a keyword that includes one or more characters;
displaying, within the first object, the one or more characters included in the keyword; detecting a selection of the first object displayed in the keyword portion, wherein the selection represents input to assign a shortcut key to the keyword represented by the first object; in response to detecting the selection:
displaying a second object in the other portion, and
displaying, within the second object, the one or more characters included in the keyword;
identifying a character as a shortcut key to the keyword; and displaying, within the second object, the one or more characters included in the keyword and the identified character.

8. The method of claim 7, wherein the identified character is one of the one or more characters included in the keyword.

9. The method of claim 7, wherein the keyword includes a plurality of characters, and wherein the identified character is a first character of the plurality of characters.

10. The method of claim 7, further comprising:
detecting a selection of a media file;
detecting input of the shortcut key; and
assigning the keyword to which the shortcut key is assigned, to the media file.

11. The method of claim 7, wherein the identified character is a character that is not included in the one or more characters included in the keyword.

12. The method of claim 7, further comprising:
receiving input to alter the identified character; and
altering the identified character in response to the input, resulting in an altered character, wherein the altered character is assigned as the shortcut key to the keyword.

13. A non-transitory computer-readable storage medium encoding instructions executable by a processor to perform operations comprising:
receiving input to assign a shortcut key to a keyword including a plurality of characters so the keyword is assignable to a media file by a selection of the shortcut key;
identifying, by a processor, a first character of the plurality of characters to assign as the shortcut key;
determining, by the processor, that the first character of the plurality of characters has been previously assigned as a shortcut key of another keyword;
in response to the determining, identifying, by the processor, a subsequent character of the plurality of characters to assign as the shortcut key; and
assigning, by the processor, the subsequent character as the shortcut key to the keyword, wherein the keyword is assignable to the media file upon a selection of the subsequent character.

14. The non-transitory computer-readable storage medium of claim 13, the operations further comprising:
in response to determining that the first character of the plurality of characters has not been assigned as a shortcut key of any other keyword, assigning the first character of the plurality of characters as the shortcut key to the keyword, wherein the keyword is assignable to the media file upon a selection of the first character.

15. The non-transitory computer-readable storage medium of claim 13, the operations further comprising:
in response to determining that each of the plurality of characters included in the keyword has been assigned as a shortcut key of a corresponding keyword, assigning an arbitrary character not included in the plurality of characters and not assigned to any other keyword as the shortcut key to the keyword.

16. The non-transitory computer-readable storage medium of claim 13, wherein the plurality of characters included in the keyword includes numbers, letters of an alphabet, or combinations of them.

* * * * *